E. T. STARR.
Dentist's Chair.
No. 240,050.                    Patented April 12, 1881.
Fig. 3.
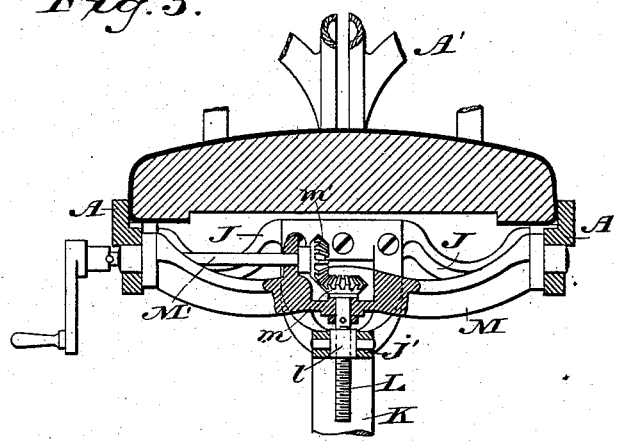
Fig. 2.
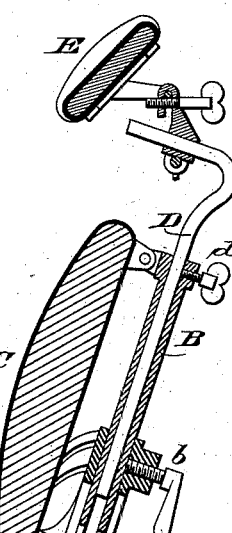
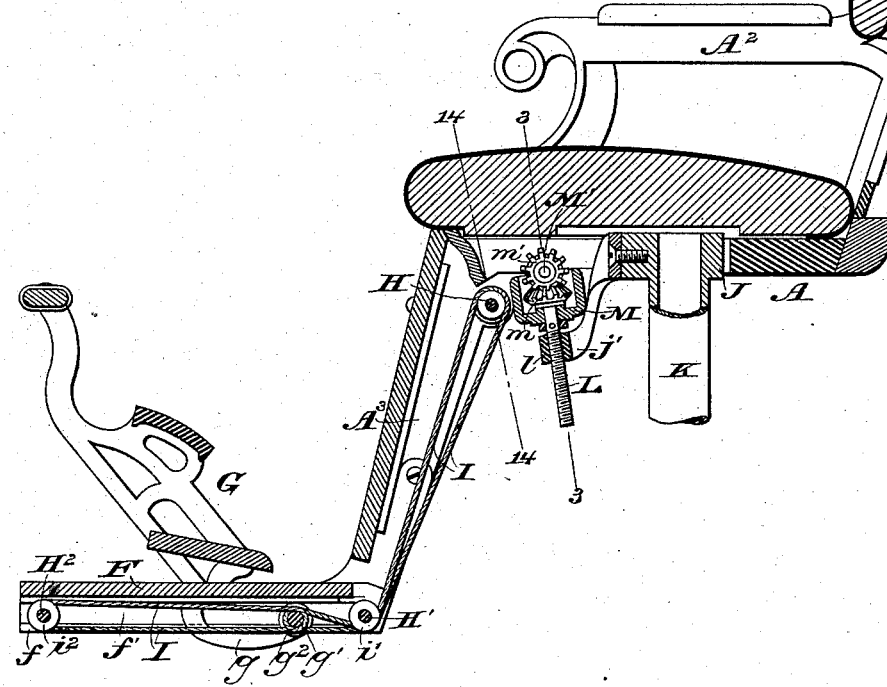
WITNESSES.                              INVENTOR
Wm. A. Skinkle,                          Eli T. Starr.
Geo. W. Breck.
                By his Attorneys
                Baldwin Hopkins & Peyton

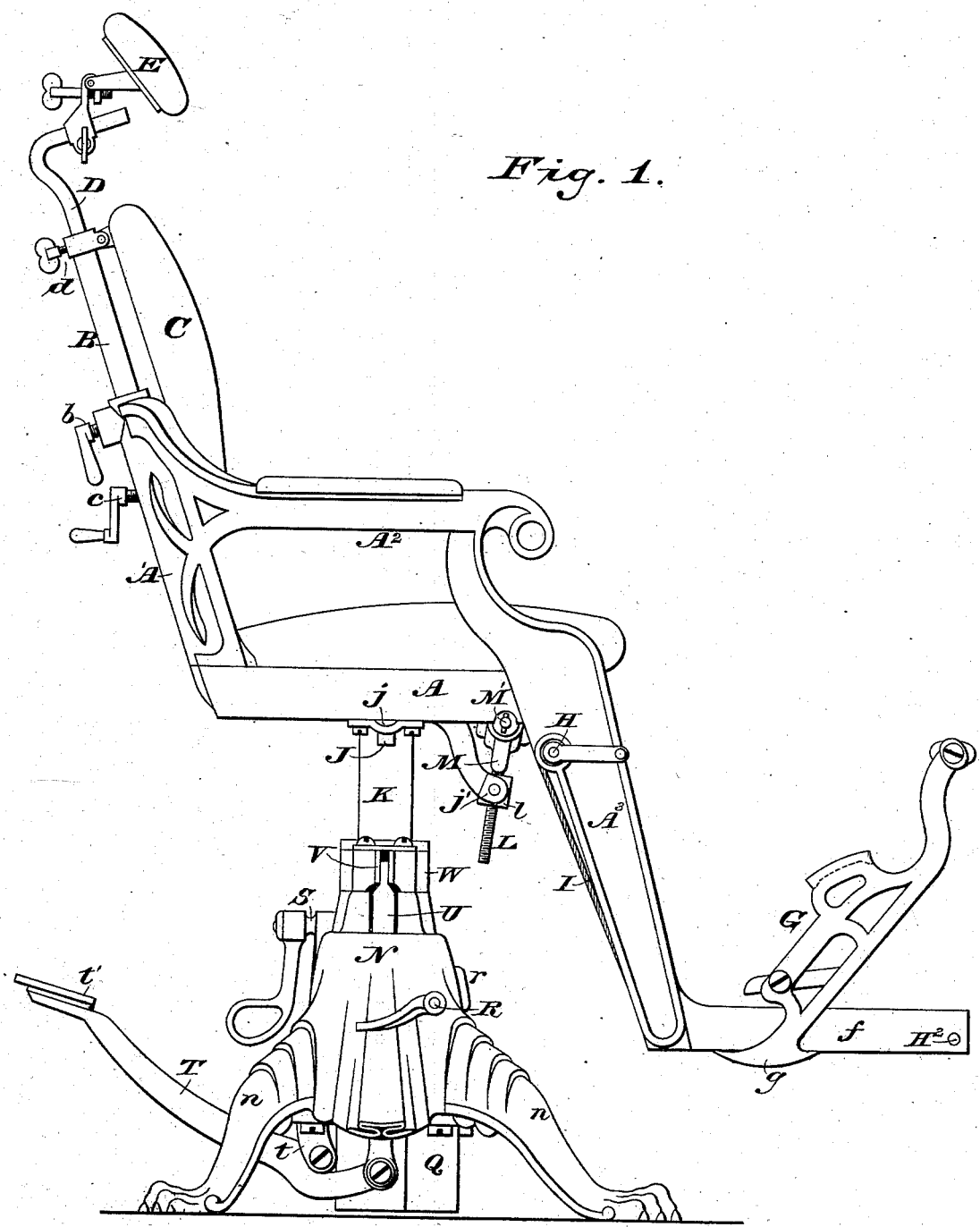

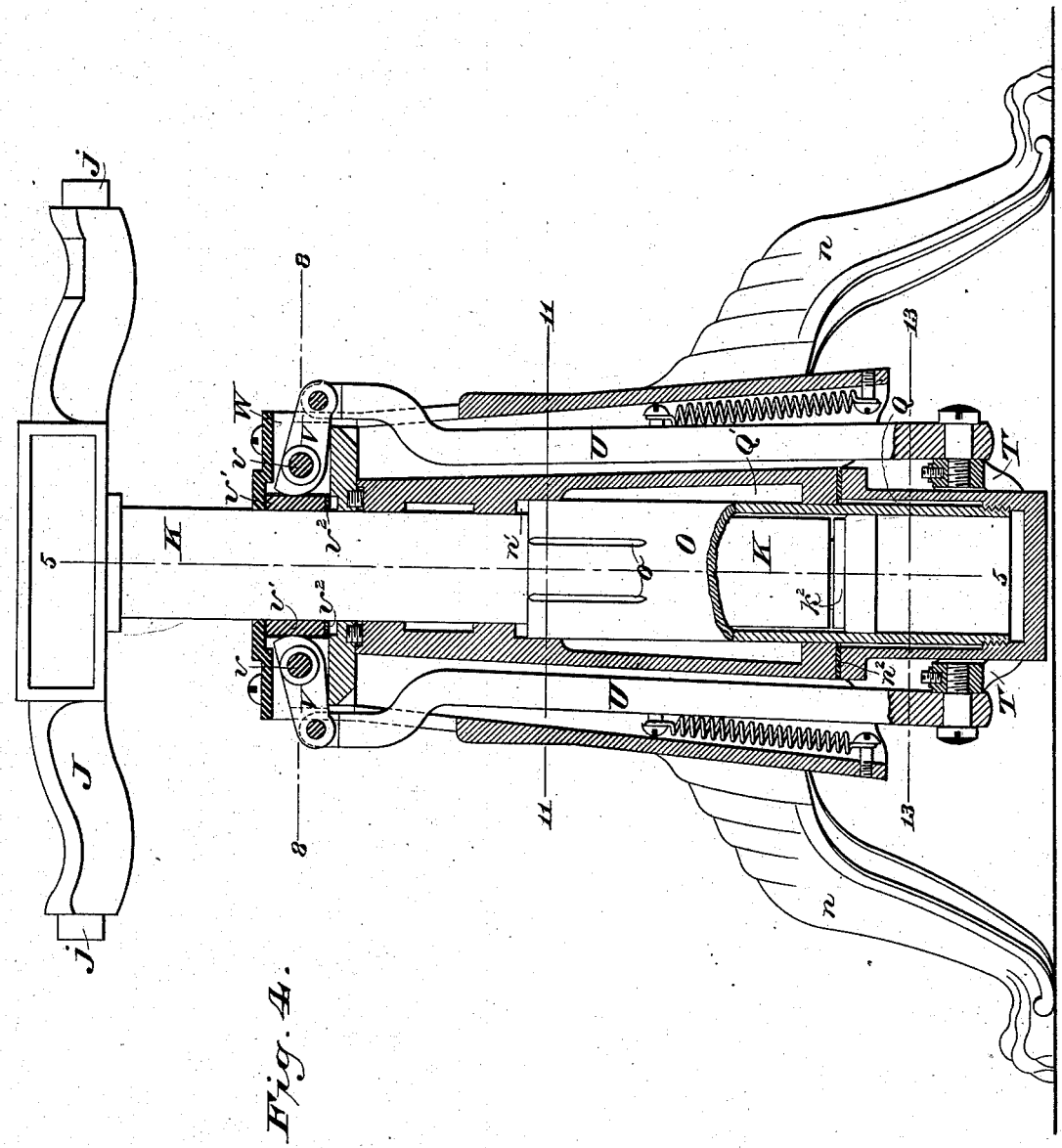

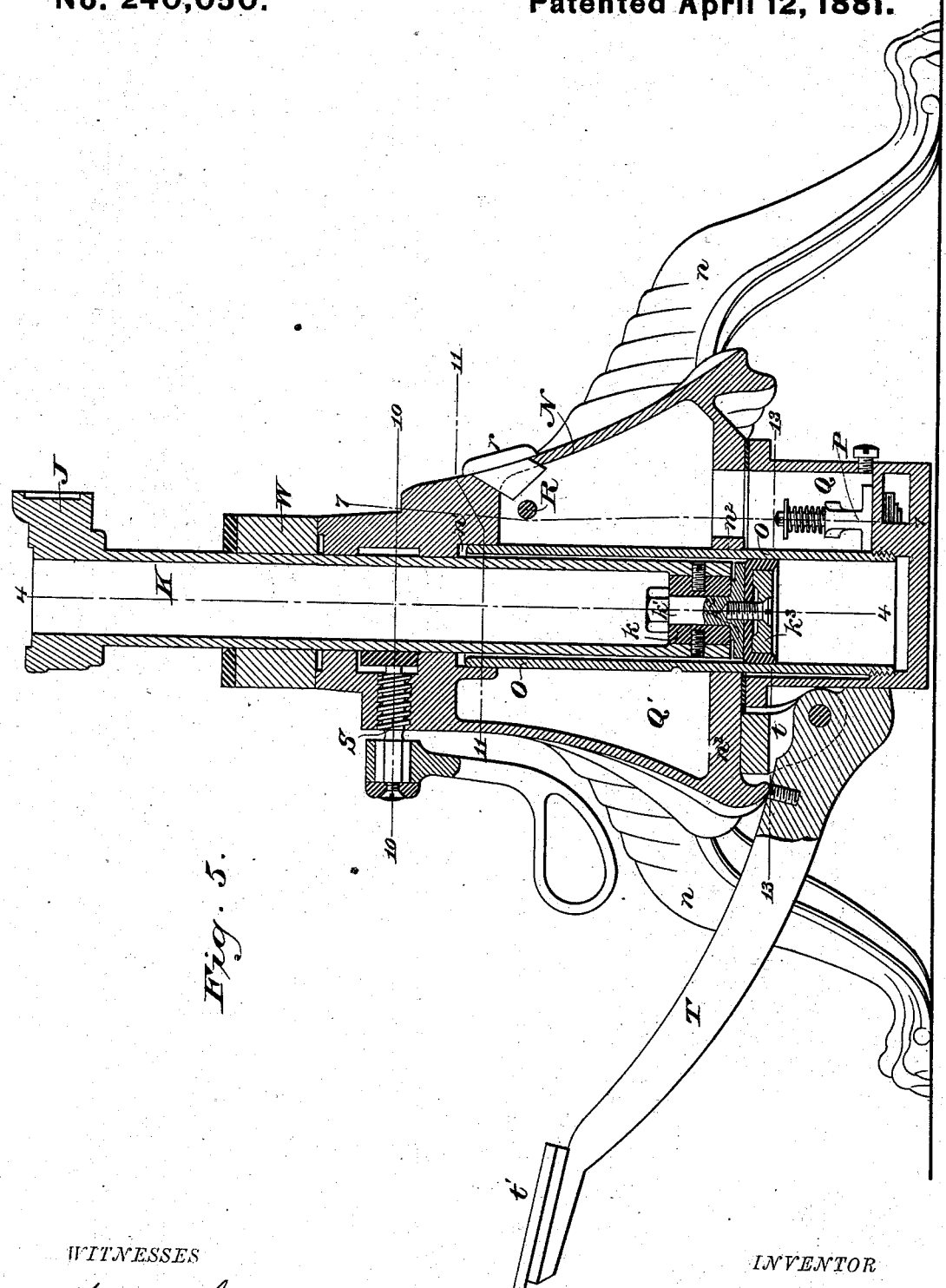

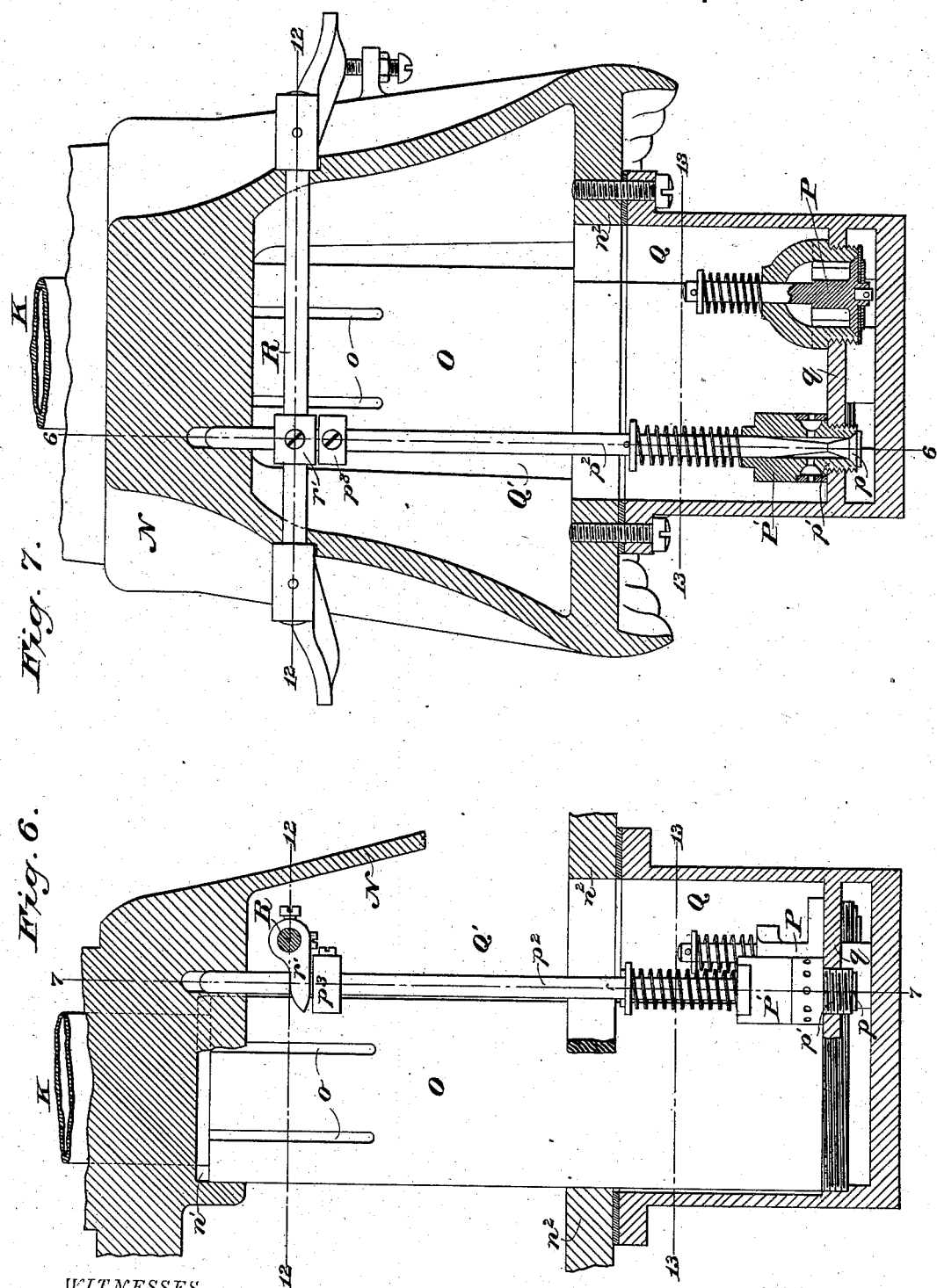

E. T. STARR.
Dentist's Chair.
No. 240,050.
7 Sheets—Sheet 6.
Patented April 12, 1881.
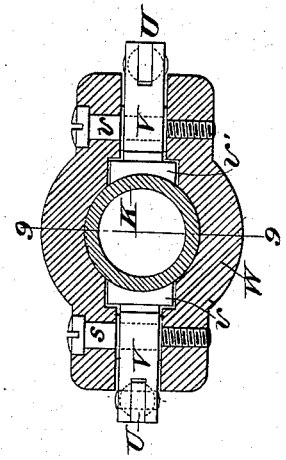
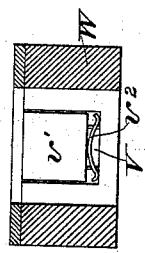
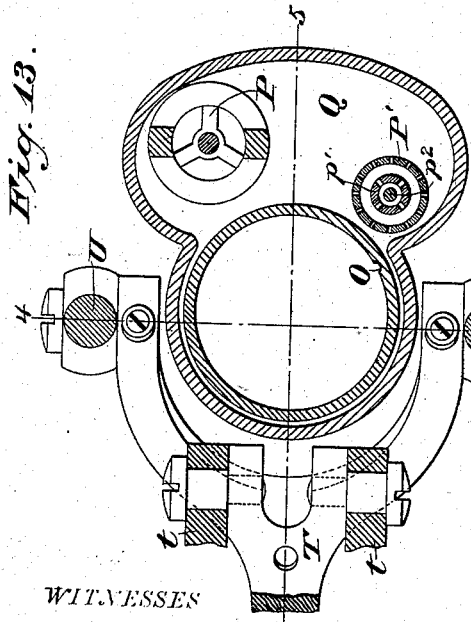
WITNESSES
Wm A Skinkle
Geo W Breck
INVENTOR
Eli T Starr.
By his Attorneys
Baldwin Hopkins & Peyton E. T. STARR.
Dentist's Chair.
No. 240,050. Patented April 12, 1881.
Fig. 14. Fig. 15.
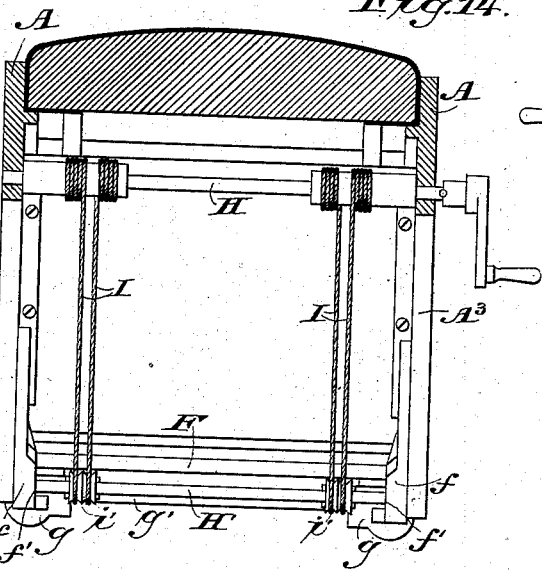
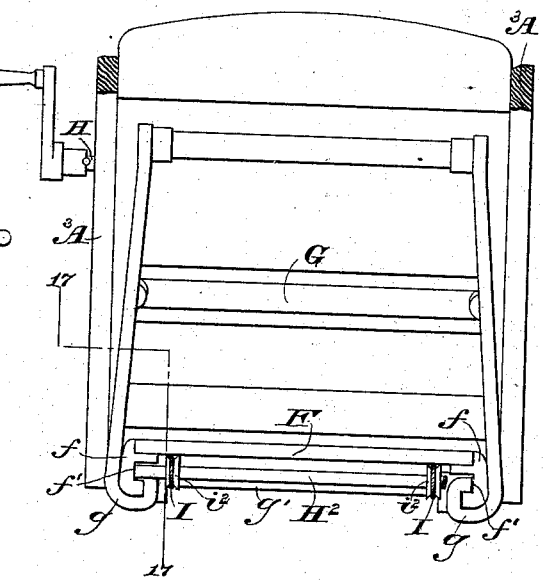
Fig. 16. Fig. 17.
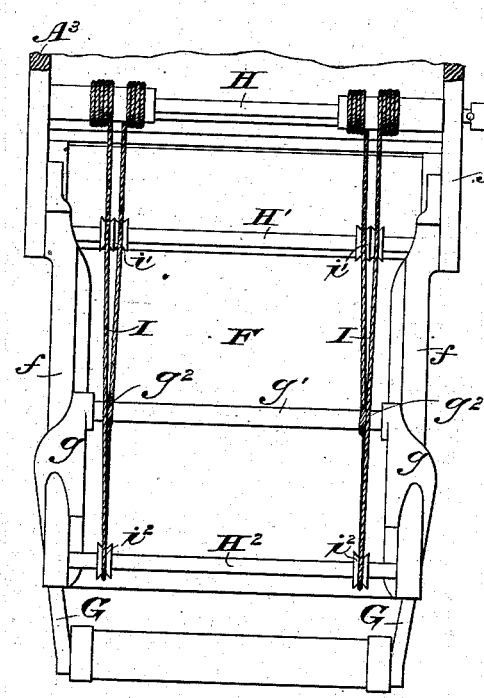
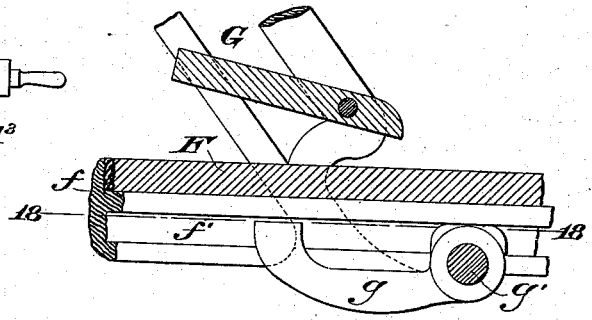
Fig. 18.
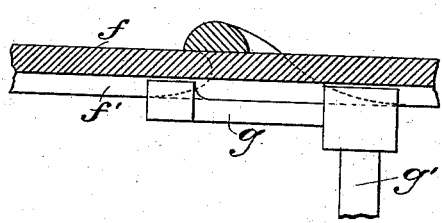
WITNESSES
Wm. A. Skinkle,
Geo. W. Breck.
INVENTOR
Eli T. Starr.
By his Attorneys
Baldwin Hopkins & Peyton

UNITED STATES PATENT OFFICE.

ELI T. STARR, OF PHILADELPHIA, PENNSYLVANIA, ASSIGNOR TO SAMUEL S. WHITE, OF SAME PLACE; J. CLARENCE WHITE AND S. S. WHITE, JR., EXECUTORS OF S. S. WHITE, ASSIGNORS TO JAMES W. WHITE, J. CLARENCE WHITE, AND H. M. LEWIS, TRUSTEES, OF SAME PLACE.

DENTIST'S CHAIR.

SPECIFICATION forming part of Letters Patent No. 240,050, dated April 12, 1881.

Application filed July 7, 1879.

*To all whom it may concern:*

Be it known that I, ELI T. STARR, of the city and county of Philadelphia, in the State of Pennsylvania, have invented certain new and useful Improvements in Dentists' Chairs, of which the following is a specification.

My invention relates to dentists' chairs of the class in which is embodied a fluid supporting or sustaining column, with mechanism to raise and lower the chair body or seat relatively to its base.

My invention constitutes an improvement upon the hydrostatic pedal-lever stool or chair shown in Bramble and Deihl's reissued Letters Patent No. 8,294, of June 25, 1878, and upon the dental chair shown in John B. Waring's application for Letters Patent of the United States filed January 2, 1878, this present application being a division of my application for Letters Patent of the United States filed on or about the 21st day of November, 1878, now patented as No. 222,092, under date of November 25, 1879.

In my said application of November 21, 1878, patented as aforesaid, I have specifically claimed certain features, parts, or combinations of my present invention, and therefore do not claim herein the features, parts, or combinations so expressly and specifically claimed. This present application contemplates and is intended to embody claims covering any and all other patentable subject-matter of my invention not claimed in the application of 1878, a like disclaimer having been entered in my said application of 1878 in favor of this present one to any and all patentable subject-matter not expressly claimed therein.

The objects of my invention are, to readily raise and lower the chair-body or seat relatively to the base without shock or jar; to apply the lifting mechanism upon opposite sides of the plunger to raise it, in contradistinction to applying the lifting mechanism beneath or upon the end of the plunger, as when the fluid column and pump are employed as the lifting mechanism, or to applying said mechanism to one side only of a plunger or spindle provided with a rack or irregularities in its surface; to hold or maintain the chair body or seat securely at any desired height or elevation relatively to the base; and to improve the construction of various parts of the chair, conducive to its more easy, steady, and advantageous operation, as hereinafter specified.

The accompanying drawings represent a dental chair, or one organized more especially for the use of dentists, embodying all my present improvements. Obviously, however, some of them may be used without the others, and in chairs differing in their details of construction from the one therein represented. The details of construction shown may obviously also be modified in various well-known ways without departing from the spirit of my invention, which variations, in most instances, would readily suggest themselves to a skilled mechanic in this branch of the art on examining this specification and drawings.

Figure 1 represents a side elevation of my improved chair; Fig. 2, a vertical longitudinal central section through the portions other than the base and the devices secured thereto. Fig. 3 represents a transverse section through the front of the chair-body, partly on the line 3 3 of Fig. 2, showing the mechanism for rocking or tilting the chair on its supporting-plunger. Fig. 4 represents a view in elevation, partly in vertical section, on the line 4 4 of Figs. 5, 12, and 13, through the chair lifting and supporting mechanism. Fig. 5 represents a similar view on the line 5 5 of Figs. 4, 12, and 13, showing a section at right angles to that depicted in Fig. 4. (Figs. 4 and 5 are on a scale larger than that of the preceding figures.) Fig. 6 represents a vertical section through the base of the chair on the line 6 6 of Fig. 7, and Fig. 7 a similar section on the line 7 7 of Fig. 6, both these figures showing the valve-tripping mechanism, and both figures being on a still larger scale than that of Figs. 4 and 5. Fig. 8 represents a horizontal transverse section through the base on the line 8 8 of Fig. 4, showing the details of the lifting-shoes. Fig. 9 represents a vertical transverse section on the line 9 9 of Fig. 8. Fig. 10 represents a transverse section through the base on the line 10 10 of Fig. 5, showing mechanism for clamping the supporting-plunger to prevent its turning horizontally in its sheath or cylinder; Fig. 11, a similar section on the line 11 11 of Figs. 4 and 5; Fig. 12, a similar section on the line 12 12 of Figs. 6 and 7, showing other details of the valve-tripping mechanism. (Figs. 8 to 12, inclusive, are on the same scale as Figs. 4 and 5.) Fig. 13, a similar section on the line 13 13 of Figs. 5, 6, and 7, showing further details of the valve and of the lifting mechanism, this figure being on the same scale as Figs. 6 and 7; Fig. 14, a view of the back side of the foot-board-supporting pendent frame, partly in section, on the line 14 14 of Fig. 2. Fig. 15 is a view in elevation of the foot-supporting mechanism as seen from the front; Fig. 16, a bottom or inverted plan view of the parts shown in Figs. 14 and 15; Fig. 17, a detail view, partly in section, showing portions of the foot-support or foot-rest frame; and Fig. 18, a longitudinal section on the line 18 18 of Fig. 17.

The chair-body is shown as constructed in a manner similar to that of the body of the well-known S. S. White dental chair, patented February 20, 1877, as No. 187,573, and consists of a seat-frame, A, supporting a back-frame, A', arm-frame $A^2$, and pendent foot-board-supporting frame $A^3$, which latter in this instance forms a continuation of the arm-frame.

In a socket or guide in the back-frame A' a tube, section, or slide, B, carrying a back-pad, C, telescopes or moves freely endwise, and is locked at any desired point in its range of movement by a suitable clamp-screw, $b$. The back-pad is hinged or pivoted at its upper end, and its lower end has the capacity of being adjusted backward and forward (or to and from the supporting-frame) by means of a set-screw, $c$. The telescoping or endwise-moving tube carrying the back-pad receives an endwise-moving or telescoping rod, D, carrying on its upper bent end a head-rest, E, and its adjusting mechanism, which may be of any well-known construction. This vertically-adjustable head-rest bar is locked in position by a set-screw or clamp, $d$.

The construction above described permits of adjustment to accommodate persons differing in size, as well as to insure their ease and comfort, by varying the angle of inclination between the seat and back; but as this improved construction of chair-body is the invention of S. S. White, (patented, as before stated,) it, of course, is not claimed herein.

The foot-board proper, F, is secured between suitable side bars or brackets, $f\,f$, one at each side, the inner bent ends of which are securely attached to and between the lower ends of the side pieces of the pendent frame $A^3$ in a well-known way. It is obvious, however, that the brackets which support the foot-board may be cast with or form part of the pendent frame $A^3$. The inner sides of the straight projecting portions of these bars or brackets $f\,f$ are provided with longitudinal grooves $f'\,f'$, for the reception of the lower ends of the side arms or supports, $g\,g$, of a foot-rest or foot-rest frame, G, the said lower ends being cast in such form or bent over in such manner as to fit the outer sides of the bars $f\,f$, while projecting around beneath the bars to enter the guide-grooves $f'\,f'$ above mentioned. This construction gives the foot-rest frame a capacity to slide or be adjusted upon the side bars of the stationary foot-board F to and from the seat of the chair, while said frame is firmly supported at all points in its range of movement, the ends of the arms $g\,g$ of the foot-rest frame fitting the guide-grooves being divided or branched in order to give two points of support or bearing in the grooves for said frame at each side thereof. These side arms or supports, $g\,g$, of the foot-rest frame carry three foot-rest or foot-supporting cross-bars—in this instance one a swiveling turning bar connecting their outer ends, another bar or board connecting their lower ends just above the stationary foot-board proper, and a third or intermediate bar connecting the arms at or about their center. The ends of the arms beneath the stationary board are also connected by a brace rod or bar, $g'$, which also serves an additional purpose, as will presently appear.

In order to adjust the foot-rest or foot-rest frame upon the foot-board toward and from the seat, to accommodate the various persons occupying the chair in an easy, noiseless, and convenient manner, I mount in suitable bearings, preferably near the front and beneath the seat-frame, a windlass-shaft, H, to which a suitable crank or handle is to be applied, from a suitable drum at each end of which shaft passes an endless cord, I, to and under a double set of intermediate pulleys, $i'$ $i'$, one set being mounted upon the shaft H' near each end, and from thence each cord passes around its respective pulley $i^2$, mounted upon a shaft, $H^2$, secured near the front end of the foot-board proper. These cords or belts are so wound upon their respective drums that one portion or the other of each cord winds upon or unwinds from its drum, in whichever way the windlass-shaft is rotated, and as one portion of each cord intermediate of the pulley-shafts H' $H^2$ is secured or fastened at $g^2$ to the rod or bar $g'$, the foot-rest frame will be drawn positively toward the seat or carried positively away therefrom, according to the direction in which the windlass is turned, which operation will clearly be understood by inspecting Figs. 2, 14, and 16 of the drawings.

It will be obvious that instead of having a belt or cord at each side to adjust the foot-rest a single belt might be employed located at the center. Other devices for reciprocating the foot-rest will also suggest themselves to a skillful mechanic as advantageous in particular cases.

The foot-board proper, instead of being fixed both as to vertical and horizontal adjustment, might be constructed in well-known ways, so as to be vertically adjustable in reference to its pendent supporting-frame, a suitable belt-tightening device being employed to preserve the requisite tension of the belts or cord.

The chair body or seat is pivoted or mounted on trunnions $j$ on a cross-bar or yoke, J, fixed or supported upon the top of a plunger or piston, K, in such manner that the chair body or seat has the capacity of rocking or of being rocked or tilted freely backward and forward on its supports. In order to accomplish this adjustment or rocking of the chair-body, together with the patient, should one be seated therein, and retain it in position when so adjusted, I preferably employ the devices shown in the patent of White, of February 20, 1877, hereinbefore referred to, which consists of a screw, L, working through a block, $l$, journaled in a step, $j'$, projecting from the cross-bar or yoke on which the body is pivoted, the upper end of this screw being journaled (so as to be capable of turning freely, but prevented from endwise movement) in a pivoted bar, M, near the front of the seat-frame, and carrying upon said end a bevel-wheel, $m$, driven by a corresponding bevel-gear, $m'$, mounted on a winch-shaft, M', turning in suitable bearings on the bar M. Other mechanism may, however, be employed to tilt or lock the body in its tilted position.

The plunger or piston which carries the chair-body is movable endwise through a central opening in a non-rotating base, shell, or casing, N, supported upon suitable legs or feet $n$, and is also movable endwise in a cylinder, O, supported by and inclosed within the base or shell and its feet, which base and feet are preferably constructed of metal and cast in a single piece. The plunger is provided at its lower end with packing, and has the capacity of turning as well as of moving freely endwise in the cylinder, whereby the horizontal as well as vertical adjustment of the chair is accommodated, which is, in this particular, substantially similar to the chair shown in Bramble and Deihl's reissued Letters Patent hereinbefore mentioned.

In order to preserve a tight joint between the plunger and cylinder, I construct the plunger of a diameter preferably somewhat less than that of the bore of the cylinder, and secure a packing-head upon its lower end in such manner that the plunger may swivel or turn freely independently or irrespective of the packing-head, though carrying said head with it in its endwise movements. I prefer to employ a tubular plunger and provide its bore at the lower end with a suitable box or bearing, $k$, to receive a round shank or journal, $k'$, projecting from the packing-head, which preferably consists of a circular plate, $k^2$, between which and another circular plate, $k^3$, of somewhat smaller diameter, the packing material is secured, as clearly shown in Fig. 5. The upper end of the shank $k'$ projects beyond its bearing into the bore of the plunger, and is provided with a suitable nut or shoulder, whereby, while the plunger is free to turn upon the packing-head, the two are locked together in respect to endwise movement. The packing projects out from between the plates $k^2$ $k^3$ and envelops the edges of the lower plate, forming a tight joint between said plate and the cylinder. The plunger is shown as tubular; but it may be solid, if preferred, and suitably recessed at its lower end to receive the journal of the packing-head, or the said head and plunger may be coupled together by any other suitable swiveling connection.

The cylinder O communicates through valves P P', (see Figs. 6, 7, and 13,) working in a partition-plate, $q$, formed near the bottom of the cylinder, with a fluid-reservoir, Q, communicating with or forming a continuation of a cavity, Q', formed in the base or shell N, as clearly shown in Fig. 5. The lower portion, Q, of the reservoir is secured in place upon the base, shell, or casing, so as to communicate with the cavity in the base, as above stated, by suitable devices—screws, for instance—a suitable packing ring or gasket being interposed to insure a tight joint and prevent leakage of the fluid. The shell or base is provided with an opening near its upper end, ordinarily closed by a suitable plug or cap, $r$, through which opening oil or other suitable liquid or fluid may be supplied to the reservoir.

By the construction above described the chair base or shell itself constitutes the walls of the fluid-reservoir, in contradistinction to a base having a recess for the reception of both a separate reservoir and cylinder, the advantages of which are obvious.

The cylinder O, it will be observed, is secured to the reservoir-casing Q just above its bottom, and extends upward centrally in the base or shell, (being supported by and fitting snugly in the lower or bottom portion, $n^2$, of said base,) and through the reservoir-cavity Q' formed in the base. The upper end of the cylinder terminates below the top of the base in an annular recess, $n'$, formed in the base above its cavity, where it is firmly supported, as clearly shown in Figs. 4 and 5, and this upper end is provided on its periphery with longitudinal grooves, ducts, or channels $o$, to return to the reservoir any fluid that may be drawn or forced up by or past the plunger. It will thus be seen that the plunger, in its movements and when at rest, is not wholly supported by the fluid-cylinder, but above the cylinder is guided and supported by the central opening or walls thereof, in the upper end of the base, in which opening or bore the plunger fits snugly. This relieves the cylinder from too much strain and tends to aid in the preservation of a tight joint between it and the packing of the plunger. The upward movement of the plunger is limited by the upper plate, $k^2$, of the packing-head, which strikes or abuts against the annular shoulder formed in the base or shell above the top of the recess $n'$, in which the upper end of the cylinder is supported.

I have shown in Figs. 7 and 13 two valves to permit of communication between the fluid chamber or reservoir and the cylinder, both opening inwardly or downwardly against the pressure of the fluid, as in Bramble and Deihl's patent hereinbefore referred to, and have also shown them of different size, as in Waring's application above mentioned. The object of employing two valves of different size is that when the supporting-plunger is elevated or raised the fluid follows rapidly into the cylinder through the large valve, to support the plunger or piston in its elevated position, while the smaller or outlet valve, when opened, renders the descent of the piston more gradual, as is well understood. The same result may, however, be attained by valves of the same size, the forcing of the outlet-valve from its seat to a greater or less degree regulating the escape of the fluid from beneath the plunger, and consequently the rapidity of descent of the plunger. A single valve may also be employed, to permit both ingress and egress of the oil to and from the cylinder, if desired; but the employment of the two valves is preferred.

The large valve P is of well-known construction; but the smaller or outer valve, its casing, and its operating mechanism I have improved. A tubular casing, $p'$, is secured in the partition-plate between the reservoir and cylinder, the upper end of which receives and guides the lower end of a vertical rod or connection, $p^2$, said rod being guided at its upper end in a suitable recess formed in the base or shell. The lower end of this rod $p^2$ is tapering, and is connected with the upper end of a conical or tapering valve or plug, $p$, fitting the lower end of the casing $p'$, the rod and valve being by preference formed in one piece. The tubular valve-casing is provided just above the partition-plate with a circular groove or channel, into which a series of perforations or openings lead from the bore of the casing which communicates with the fluid-cylinder, and surrounding this channel or recess and the perforations in the casing leading thereto is a perforated guard or ring, the perforations in which are preferably more numerous than those in the casing $p'$. This construction gives two series of perforations, through which the oil escapes from the cylinder back into the reservoir when the valve is opened, and thus obviates unpleasant noise from the escaping oil.

The opening of the valve is accomplished by means of a toe, wiper, or projection, $r'$, on a rock-shaft, R, which wiper acts upon a collar, $p^3$, on the rod $p^2$ and forces said rod downward, thus pushing the valve or plug from its seat. The shaft R, which operates the valve-rod, passes transversely through the base and cavity formed therein, and upon each of its ends outside the base is mounted or secured a foot piece or lever, whereby the outlet-valve may be operated by applying the foot to a separate lever upon either side of the chair.

A suitable spring confined between a collar on the lower end of the valve-rod and the upper end of the valve-casing serves to raise said rod when the pressure of the foot is removed, thus instantly closing the valve and retaining it in that position, which closing is aided and facilitated by the back-pressure of the fluid in the cylinder. The raising of the valve rod or connection or the closing of the valve is also accompanied by the return of the operating-levers to their normal position, in readiness to be again operated when it is desired to open the outlet-valve. It will be obvious, however, that the return of the levers, when the pressure is removed, may be accomplished in other ways than by the aid of the spring encircling the valve-rod above described.

A suitable clamp-screw, S, passes through the base near its top or upper end and forces (when turned in the right direction by the foot of the operator, which is applied to a depending lever secured thereto) a shoe or plate against the side of the plunger, to lock said plunger to the base and prevent endwise or turning movement of the plunger therein.

In order to retain the advantages of a foot-lever for elevating the chair-body and plunger, in connection with a fluid supporting-column, which is the invention of Bramble and Deihl, (patented as hereinbefore stated,) while obviating the necessity of applying the lifting mechanism beneath the plunger, as with the fluid column and pump, or to applying it to one side of the plunger in lieu thereof by means of a rack or ratchets and pawl, I have devised apparatus to these ends. This elevating apparatus preferably consists of a foot-lever, T, pivoted to a depending arm or bracket, $t$, secured to the non-rotating chair-base in this instance, or it may be pivoted upon the base itself, the lever being provided at its outer end with a foot piece or pad, $t'$, to which the foot of the operator is to be applied, and at its inner end with forked arms partially encircling the fluid-reservoir, which is suspended or inclosed within the legs or base of the chair. To the ends of these arms are pivoted or pin-jointed the lower ends of vertical links or arms U U, movable endwise in recesses or chambers formed in the base or shell, as clearly shown in Figs. 4, 10, 11, and 12. The upper ends of these links are bent outward and upward, as clearly shown in Fig. 4, (the upper end of the base being slotted for that purpose,) and are pin-jointed or pivoted to the outer ends of short links or levers, V V, having their fulcra or pivots at $v$, and provided on their inner ends with cam surfaces or faces, which bear against "shoes" or plates $v'$ $v'$ fitting upon opposite sides of the plunger. The inner portions of the levers V V and the shoes are inclosed within a movable head, W, preferably similar in shape to the upper end of the base, which head travels with the cam-levers and shoes which clamp the plunger in the elevating operation.

In order to accommodate the slight downward movement of the shoes caused by the cam-levers acting against them when operated to clamp the plunger, the shoes are loosely mounted in their carrying-head and rest upon light plate-springs $v^2$, as clearly shown in Fig. 9.

It will be obvious that additional clamping levers and shoes could be added, so as to clamp the plunger upon more than two sides or places, if desired; but, as above stated, the construction shown is preferred.

By applying the lifting mechanism upon opposite sides of the plunger to elevate it the chair is much improved, owing to its more easy, noiseless, and steady operation. I also consider it advantageous, in the construction and operation of the chair, to so organize the lifting-lever, with the devices to take hold of the plunger, that the lever is located near the bottom of the base, while the lifting devices act upon the plunger above the base.

The operation of my improved chair, as far as relates to the elevating and sustaining mechanism, is as follows: The elevation of the plunger is effected by the foot of the operator, who depresses the outer end of the elevating-lever, which depression raises the inner forked end of said lever, and with it the vertical links pivoted thereto, which links, in turn, immediately upon the commencement of their upward movement, act upon the cam-levers, forcing the shoes against the plunger upon and from opposite sides, and securely clamping the plunger between them; and as the elevating movement continues the plunger is lifted bodily, carrying with it, of course, the chair body or seat mounted thereon. This upward movement of the plunger causes the fluid from the reservoir to flow through the large inlet-valve opening into the chamber that communicates directly with the cylinder and follow the plunger in its ascent. When the pressure on the lever is removed its outer end is raised to its normal position, ready for the next downward movement that is to add to the elevation of the chair, this being caused by the action of suitable springs, (shown clearly in Fig. 4,) the tension of which is always exerted to force or draw down the inner end of the lever and elevate its outer end. This downward movement causes a release of the clamping-shoes from the plunger and compels them, together with the head inclosing the upper portion of the elevating apparatus, to move down in position ready to act upon the next operation or depression of the elevating-lever. This leaves the plunger free to turn so that the chair-body can be adjusted horizontally. Immediately upon the release of the plunger a slight downward or backward movement thereof takes place, which instantly closes the valve by which the fluid was allowed to enter the cylinder, (which closing of the valve may or may not be aided by suitable springs in well-known ways,) and thus prevents the escape of the fluid, which, being practically non-elastic, consequently cushions and supports the plunger in its elevated position. This elevating operation can, of course, be continued until the limit of the range of movement of the plunger in an upward direction is reached.

To lower the plunger, and consequently the chair body or seat carried by it, the outlet-valve (the small one in the preferred construction) is forced from its seat, which allows the fluid to escape or flow back from the cylinder to the reservoir, thus permitting the plunger to descend gradually and without shock or jar. The operation of the valve is accomplished by means of the foot of the operator, which may be applied to a separate lever upon either side of the chair, as before stated, which is highly advantageous, and an improvement in the working of the chair of great merit.

The advantages of a dental chair constructed according to my invention have been amply demonstrated by practical operation, and its superiority over other chairs of this class constructed as hereinbefore recited is obvious.

I do not wish to be understood as claiming, broadly, first, the combination, in a dental chair, of a base, a plunger, a chair-body capable of varying adjustment mounted thereon, a fluid supporting-column, an elevating foot-lever, and a handle or lever independent of the elevating foot-lever or elevating mechanism for operating the valve, or mechanism that permits of the escape of the fluid from beneath the plunger to lower the chair; secondly, a chair-body mounted upon a plunger sustained at any desired height by means of a fluid medium, the said chair-body being adapted to be variably inclined, and being provided with means for securing it at any desired angle; and, thirdly, the combination of a base or stand, a vertically-movable support, a fluid medium for sustaining said support, a chair-body carried by said support, adapted to be adjusted vertically, horizontally, and as to inclination relatively to the base, and mechanism for accomplishing these adjustments of the chair-body. These three recited combinations or subjects-matter are the invention of John B. Waring, whose application has hereinbefore been alluded to. Nor do I wish to be understood as claiming, broadly, a foot-rest sliding or reciprocating toward and from a chair-seat, as that is very old; but I am not aware that prior to my invention the stationary foot-board or platform of a dental chair has ever heretofore been combined with a sliding foot-rest reciprocated positively backward and forward by mechanism convenient to the operator.

I claim as my invention—

1. The combination, substantially as hereinbefore set forth, of the foot-board of the chair, the foot-rest fitted to move backward and forward relatively to the foot-board, and mechanism, substantially as described, independent of the connections which fit the foot-rest, to move backward and forward on the foot-board to accomplish the movements of said foot-rest.

2. The combination, substantially as hereinbefore set forth, of the base, the fluid-reservoir, the cylinder, the seat-supporting plunger, movable endwise and capable of turning in said cylinder, the outlet-valve between the cylinder and reservoir, the valve-rod, the collar or enlargement near the upper end of said rod, the rock-shaft extending through the base, provided with a wiper to act upon said collar of the valve-rod, and the foot-levers mounted upon said rock-shaft at opposite sides of the base.

3. The elevating foot-lever, pivoted beneath or at the bottom of the base, in combination with and actuating mechanism, substantially such as described, above said base to elevate the plunger.

4. The combination, substantially as hereinbefore set forth, of the base, the cylinder, the plunger having a smooth periphery or surface, movable endwise in the cylinder, and frictional clamping devices acting upon the plunger to elevate it.

5. The combination, substantially as hereinbefore set forth, of the chair-base, the plunger, two clamps fitted to operate at opposite sides of said plunger, and the elevating-lever.

6. The combination, substantially as hereinbefore set forth, of the chair-base, the plunger, the seat-frame carried by said plunger, two clamps fitted to operate at opposite sides of said plunger, and the elevating-lever.

In testimony whereof I have hereunto subscribed my name.

ELI T. STARR.

Witnesses:
    JOHN URIAN,
    WM. J. PEYTON.